United States Patent
Wang et al.

(10) Patent No.: US 9,736,751 B2
(45) Date of Patent: Aug. 15, 2017

(54) DATA TRANSMISSION METHOD AND SYSTEM

(71) Applicant: ZTE Corporation, Shenzhen, Guangdong (CN)

(72) Inventors: Xin Wang, Shenzhen (CN); Feng He, Shenzhen (CN); Lifeng Han, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 71 days.

(21) Appl. No.: 14/779,914

(22) PCT Filed: Sep. 27, 2013

(86) PCT No.: PCT/CN2013/084528
§ 371 (c)(1),
(2) Date: Sep. 24, 2015

(87) PCT Pub. No.: WO2014/153937
PCT Pub. Date: Oct. 2, 2014

(65) Prior Publication Data
US 2016/0050611 A1    Feb. 18, 2016

(30) Foreign Application Priority Data
Mar. 26, 2013  (CN) .......................... 2013 1 0101008

(51) Int. Cl.
*H04W 40/02* (2009.01)
*H04W 28/08* (2009.01)

(52) U.S. Cl.
CPC ........... *H04W 40/02* (2013.01); *H04W 28/08* (2013.01)

(58) Field of Classification Search
None
See application file for complete search history.

(56) References Cited

U.S. PATENT DOCUMENTS 6,678,736 B1 * 1/2004 Malmkvist .......... H04L 12/5695
                                                    709/231
2002/0196735 A1 * 12/2002 Hayes ................. H04L 12/4641
                                                    370/216
(Continued)

FOREIGN PATENT DOCUMENTS

CN    102215530 A    10/2011
CN    102958102 A     3/2013
(Continued)

OTHER PUBLICATIONS

Supplementary European Search Report in European application No. 13880127.9, mailed on Feb. 22, 2016.
(Continued)

*Primary Examiner* — Chi H Pham
*Assistant Examiner* — Soon-Dong D Hyun
(74) *Attorney, Agent, or Firm* — Oppedahl Patent Law Firm LLC (57) ABSTRACT

Disclosed is a data transmission method. The method includes that: when downlink data is transmitted, a master node shunts, on a Radio Link Control (RLC) sublayer, the downlink data to obtain shunted data packets, and sends the shunted data packets to shunting nodes; the shunting nodes process the shunted data packets, and send the processed data packets to a User Equipment (UE); and when uplink data is transmitted, the master node converges data packets sent from the shunting nodes and data packets sent from the UE, and sends the converged data packets to a core network. Also disclosed is a data transmission system. With embodiments of the disclosure, mobile communications system is able to provide an optimized service, a higher bandwidth and better performance.

12 Claims, 5 Drawing Sheets

(56) References Cited

U.S. PATENT DOCUMENTS

| | | | |
|---|---|---|---|
| 2005/0223056 A1* | 10/2005 | Jeffries | H04L 47/10 709/201 |
| 2007/0127369 A1 | 6/2007 | Sebire | |
| 2008/0092181 A1* | 4/2008 | Britt | H04N 7/1675 725/87 |
| 2008/0181241 A1* | 7/2008 | Regan | H04L 45/02 370/401 |
| 2013/0111038 A1* | 5/2013 | Girard | H04L 69/16 709/226 |
| 2013/0268986 A1 | 10/2013 | Venkatachalam | |
| 2013/0287139 A1 | 10/2013 | Zhu | |
| 2013/0288686 A1 | 10/2013 | Chou | |
| 2013/0294423 A1 | 11/2013 | Wang | |
| 2014/0036669 A1 | 2/2014 | Yang | |
| 2014/0050086 A1 | 2/2014 | Himayat | |
| 2014/0101726 A1 | 4/2014 | Gupta | |
| 2014/0153390 A1 | 6/2014 | Ishii | |
| 2014/0156031 A1* | 6/2014 | Anderson | G06Q 10/06 700/29 |
| 2014/0161004 A1 | 6/2014 | Wang | |
| 2014/0161118 A1* | 6/2014 | Iyer | H04W 52/0216 370/351 |
| 2014/0198655 A1 | 7/2014 | Ishii | |
| 2014/0348115 A1 | 11/2014 | Wang | |
| 2014/0355529 A1 | 12/2014 | Zhu | |
| 2015/0139079 A1 | 5/2015 | Zhu | |
| 2015/0208274 A1 | 7/2015 | Himayat et al. | |

FOREIGN PATENT DOCUMENTS

| | | |
|---|---|---|
| WO | 2005089003 A1 | 9/2005 |
| WO | 2012148482 A1 | 11/2012 |
| WO | 2012155782 A1 | 11/2012 |
| WO | 2012166975 A1 | 12/2012 |

OTHER PUBLICATIONS

Anonymous: "Views on Rel-12 and onwards for LTE and UMTS, RWS-120006", RAN workshop on Rel-12 and onwards, Jun. 12, 2012 (Jun. 12, 2012). pp. 1-21. XP055249733, Ljubljana, Slovenia Retrieved from the Internet: URL: http://www.3gpp.org/ftp/workshop/201206-11 12 RAN REL12/Docs/RWS-120006.zip [retrieved on Feb. 12, 2016] * p. 10-p. 11 *, mailed on Jun. 12, 2012.

International Search Report in international application No. PCT/CN2013/084528, mailed on Jan. 2, 2014.

English Translation of the Written Opinion of the International Search Authority in international appliation No. PCT/CN2013/084528, mailed on Jan. 2, 2014.

\* cited by examiner

DATA TRANSMISSION METHOD AND SYSTEM

TECHNICAL FIELD

The present disclosure generally relates to the field of mobile communications, and more particularly, to a method and system for transmitting data.

BACKGROUND

With the evolution of wireless communications technology and protocol standards, the mobile packet services have experienced tremendous developments, and the capability of data throughput of a single terminal is improved continuously. Due to the rapid growth of terminal data traffic, service capabilities and deployment strategy of mobile communication networks are faced with tremendous pressure and challenges. On one hand, operators desire to strengthen deployment and communications technology of the existing networks, and on the other hand, desire to accelerate the promotion of new technologies and network expansion, so as to improve network performance rapidly. However, so far in the development of the mobile communication, it becomes increasingly difficult to provide economical, flexible, high capability of service only by means of enhancing the macro networks. Thus, a very attractive solution may be to deploy Low Power Nodes (LPNs) to provide small cell coverage. Particularly, there is a need for providing a good user experience to mobile terminals located at indoor/outdoor hot spot region having a large amount of data transmission.

At present, the Third Generation Partnership Projects (3GPP) considers that one of subjects in the future network development is to ensure communication capacity by deploying LPNs in the coverage of macro networks. However, after deploying LPNs in the coverage of macro networks, the cooperative works between the LPNs and Macro eNB (MeNB) are very few and merely involve that: when a User Equipment (UE) enters the coverage of an LPN, the UE is disconnected from the MeNB and is served by the LPN instead. That is to say, when there is a large amount of data needed to be processed by the MeNBs in the Macro Networks, the LPNs cannot provide processing resources.

In view of the above, based on the cooperative works between the MeNBs and LPNs in the prior art, the LPNs cannot provide processing resources, thus cannot assist the mobile communication system to provide an optimized service. Therefore, the needs in the network development for higher bandwidth, better performance, and lower cost of construction are not meet.

SUMMARY

Embodiments of the present disclosure provide a method and system for transmitting data, with which a mobile communications system can provide an optimized service, a higher bandwidth, and better performance.

The technical solutions of embodiments of the present disclosure are as follows.

An embodiment of the present disclosure provides a method for transmitting data. The method includes that:

when transmitting downlink data, a master node shunts the downlink data at a Radio Link Control (RLC) sublayer to obtain shunted data packets, and sends the shunted data packets to shunting nodes; the shunting nodes process the shunted data packets, and sending the processed data packets to a UE;

when transmitting uplink data, the master node converges data packets sent from a shunting node and data packets sent from a UE and sends the converged data packets to a core network.

In an embodiment, the step of shunting the downlink data at the RLC sublayer to obtain the shunted data packets and sending the shunted data packets to the shunting nodes includes that:

the master node shunts the downlink data at the RLC sublayer to obtain one or more group of shunted data packets, sends the shunted data packets to each of the shunting nodes, and sends remaining downlink data except the shunted data packets to the UE.

In an embodiment, preceding sending the shunted data packets to the shunting nodes, the method may further include that: the master node selects a shunting node for the UE according to quality of wireless signals transmitted between the UE and the shunting nodes, and sends control plane information of the UE to the selected shunting node.

In an embodiment, the method may further include that: the master node acquires quality of wireless signals transmitted between the UE and each of the shunting nodes in real-time; when quality of wireless signals corresponding to a shunting node is lower than a preset threshold, notifies the corresponding shunting node and the UE corresponding to the shunting node to suspend the shunting or remove a shunting link.

In an embodiment, the step of processing the shunted data packets may include that: according to an indication from a Media Access Control (MAC) layer, the shunting nodes send out the shunted data packets directly or send the shunted data packets after performing segmenting and/or concatenating on the shunted data packets.

In an embodiment, after the step of sending the processed data packets to the UE, the method may further include that:

the master node receives a status report returned by the UE; and determines whether to retransmit or delete the processed data packets according to the status report;

and/or, the shunting nodes receives a status report returned by the UE, and determine whether to retransmit or delete the processed data packets according to the status report.

An embodiment of the present disclosure provides a system for transmitting data. The system includes a master node and a shunting node; wherein, the master node is configured to: when downlink data is transmitted, shunt the downlink data at an RLC sublayer to obtain shunted data packets, and send the shunted data packets to the shunting node; when uplink data is transmitted, converge data packets sent from the shunting node and data packets sent from a UE and send the converged data packets to a core network;

the shunting node is configured to: when downlink data is transmitted, process the shunted data packets sent from the master node, and send the processed data packets to a UE; and when uplink data is transmitted, send the uplink data sent from the UE to the master node.

In an embodiment, the master node may include a shunting management module configured to: when downlink data is transmitted, shunt the downlink data at the RLC sublayer to obtain the shunted data packets, and send the shunted data packets to the shunting node; when uplink data is transmitted, converge data packets sent from the shunting node and data packets sent from the UE and send the converged data packets to the core network.

In an embodiment, the shunting management module may be further configured to: shunt the downlink data at the RLC sublayer to obtain one or more group of shunted data packets, send the shunted data packets to each shunting node, and send remaining downlink data except the shunted data packets to the UE.

In an embodiment, the shunting management module may be further configured to: select a shunting node for the UE according to quality of wireless signals transmitted between the UE and shunting nodes, and send control plane information of the UE to the selected shunting node.

In an embodiment, the shunting management module may be further configured to: acquire quality of wireless signals transmitted between the UE and each shunting node in real-time; when quality of wireless signals corresponding to a shunting node is lower than a preset threshold, notifying the corresponding shunting node and the UE corresponding to the shunting node to suspend the shunting or remove a shunting link.

In an embodiment, the shunting node may include an RLC protocol data unit (PDU) re-processing module configured to: when downlink data is transmitted, process the shunted data packets sent from the master node, and send the processed data packets to a UE; and when uplink data is transmitted, send the uplink data sent from the UE to the master node.

In an embodiment, the RLC PDU re-processing module may be further configured to: according to an indication from a Media Access Control (MAC) layer of a same node, send the shunted data packets directly or send the shunted data packets after performing segmenting and/or concatenating on the shunted data packets.

In an embodiment, the RLC PDU re-processing module may be further configured to: receive a status report returned by the UE; and determine whether to retransmit or delete the processed data packets according to the status report.

In the method and system for transmitting data provided in the present disclosure, a master node may shunt the downlink data at the RLC sublayer to obtain shunted data packets, and send the shunted data packets to shunting nodes. The master node may also converge the data packets sent from the shunting nodes and the data packets sent from the UEs, and send the converged data packets to the core network. Instead of working separately, shunting nodes may cooperate with the master node, with which the mobile communication system may be able to provide greater bandwidth and better service processing performance.

DETAILED DESCRIPTION

The basic idea of embodiments of the present disclosure is as follows: when downlink data is transmitted, a master node shunts, at an RLC sublayer, the downlink data to obtain shunted data packets, and sends the shunted data packets to shunting nodes; the shunting nodes process the shunted data packets and send the processed data packets to UEs; and when uplink data is transmitted, the master node converges data packets sent from the shunting nodes and data packets sent from the UEs, and sends the converged data packets to a core network.

The present disclosure is further described in detail below by specific embodiments in conjunction with the accompanying drawings.

Figure 1:
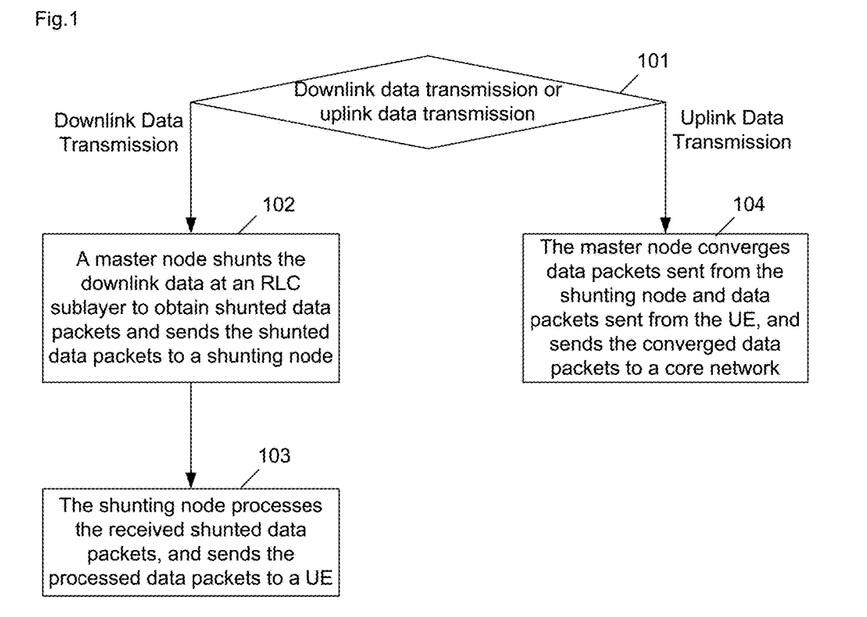
FIG. 1 is a schematic flowchart of a method for transmitting data in accordance with an embodiment of the present disclosure.

In an embodiment of the present disclosure, as shown in FIG. 1, a method for transmitting data may include following steps.

At Step 101, it is determined whether to transmit downlink data or transmit uplink data; when downlink data is transmitted, Step 102 is performed; and when uplink data is transmitted, step 104 is performed.

At Step 102, a master node shunts the downlink data at an RLC sublayer to obtain shunted data packets, and sends the shunted data packets to shunting nodes.

Specifically, the master node shunts the downlink data at the RLC sublayer to obtain one or more group of shunted data packets, sends the shunted data packets at the RLC sublayer to the shunting nodes, and sends remaining downlink data except the shunted data packets to the UEs.

Figure 2:
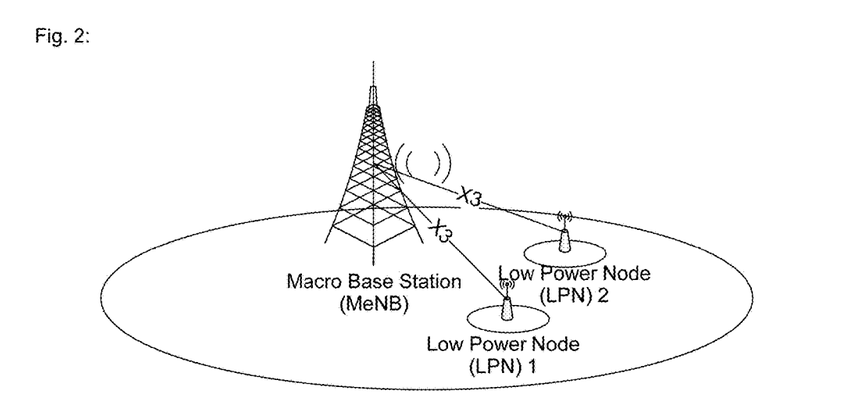
FIG. 2 is a schematic diagram of deployment scenario with a MeNB acting as a master node and LPNs acting as shunting nodes.

Here, the master node may be a MeNB. The shunting nodes are nodes in the coverage of the master node, which may be LPNs, such as lower power Pico eNBs, Relay Nodes or HeNBs. Connections between the master node and the shunting nodes may be arranged as follows: one or more shunting nodes may be deployed in the coverage of the master node; the backhaul interface between the master node and the shunting nodes may be an X3 interface; the X3 interface is an interface for transmitting control signaling and user data, which may be a wired interface (e.g., optical fibre interface) or a wireless interface (e.g., Un interface). FIG. 2 shows a deployment scenario with a MeNB acting as a master node and LPNs acting as shunting nodes.

The step of shunting the downlink data to obtain one or more group of shunted data packets may include that: the master node may shunt an RLC Protocol Data Unit (PDU) into one or more group of shunted data packets. For the size of each group of shunted data packets, the number of shunted data packets may be adjusted based on the current signal quality and/or load of each shunting node.

Before sending the shunted data packets at the RLC sublayer to the shunting nodes, the method may further include that: the master node may select one or more shunting nodes in the coverage of the master node for the UE according to quality of wireless signals transmitted between the UE and the shunting nodes, and sends control plane information of the UE to the selected shunting node. Preferably, in addition to the quality of wireless signals transmitted between the UE and the shunting nodes, the master node may select one or more shunting nodes in the coverage of the master node for the UE according to load condition of resources in the master node and/or the amount of data required by service of the UEs.

The control plane information of the UE may include context information of the UE, etc.

The step of sending the shunted data packets at the RLC sublayer to the shunting nodes may include: sending the shunted data packets directly to the shunting nodes; or, pre-processing the shunted data packets and then sending the pre-processed shunted data packets to shunting nodes. The pre-processing may be set based on the actual situation, which, for example, may be segmenting the RLC SDU.

The step of sending the remaining downlink data except the shunted data packets to the UE may be performed in accordance with an existing technology, no more details will be described here.

At Step 103, the shunting nodes may process the shunted data packets and send the processed data packets to the UE. The flow ends.

At Step 103, the processing may include: sending the shunted data packets directly; or, segmenting or concatenating the shunted data packets, for example, segmenting or concatenating the downlink data packets transmitted by the master node according to an indication from the MAC layer of the shunting nodes, adding an indication, which may be an additional filed, in the protocol header of the data packets, and then sending the data packets after encapsulation to a lower layer.

The shunting nodes determine a corresponding according to control plane information transmitted from the master node.

At Step 104, the master node may converge data packets sent from the shunting nodes and data packets sent from the UE, and send the converged data packets to a core network.

At Step 104, since converging is a function that a master node should have in the prior art, no more details will be described here.

Preferably, while performing the Steps 101 to 104, the master node may acquire the quality of wireless signals transmitted between the UE and each of the shunting nodes in real-time. When the quality of wireless signals corresponding to a shunting node is lower than a preset threshold, the master node may notify the corresponding shunting node and the UE corresponding to the shunting node that shunting is suspended or a corresponding shunting link is removed.

In addition, after the Step 103, the UE may order and de-encapsulate the data packets transmitted by the master node and the shunting nodes, and send a status report to the master node and/or the shunting nodes.

The master node and/or the shunting nodes may receive a status report returned by the UE.

The master node may, according to the status report, determine whether to retransmit the data packets and determine whether to delete the links between the shunting nodes and corresponding UE;

Specifically, the master node may receive a status report returned by the UE and/or the shunting nodes, extract a data packet reception success/failure message from the status report, count times of failures for the data packets that failed to be transmitted, and re-transmit the data packets, discard the data packets transmitted successfully; and if the times of failures for the data packets that failed to be transmitted are greater than a preset threshold, delete the links between the shunting nodes and corresponding UE.

The shunting nodes also may, according to the status report returned by the UEs, re-transmit the data packets that failed to be received by the receiving end, and delete the data packets that received successfully by the UEs from the buffer.

In addition, the shunting nodes may return a status report to the UEs.

Figure 3:
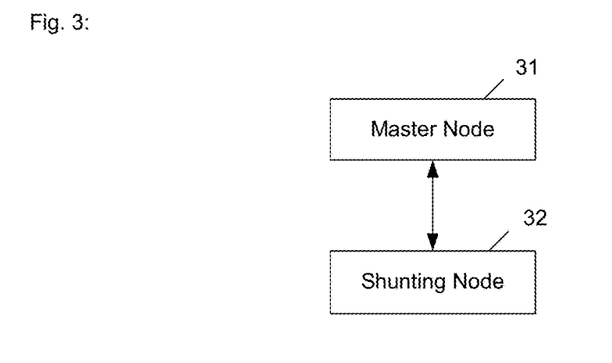
FIG. 3 is a schematic diagram of a system for transmitting data in accordance with an embodiment of the present disclosure.

In an embodiment of the present disclosure, as shown in FIG. 3, a system for transmitting data may include a master node 31 and a shunting node 32.

The master node 31 may be configured to: when downlink data is transmitted, shunt the downlink data at an RLC sublayer to obtain shunted data packets, and send the shunted data packets to the shunting node 32; when uplink data is transmitted, converge data packets sent from the shunting nodes and data packets sent from a UE, and send the converged data packets to a core network.

The shunting node 32 may be configured to: when downlink data is transmitted, process the shunted data packets sent from the master node 31, and send the processed data packets to a UE; and when uplink data is transmitted, send the uplink data sent from the UE to the master node 31.

Figure 4:
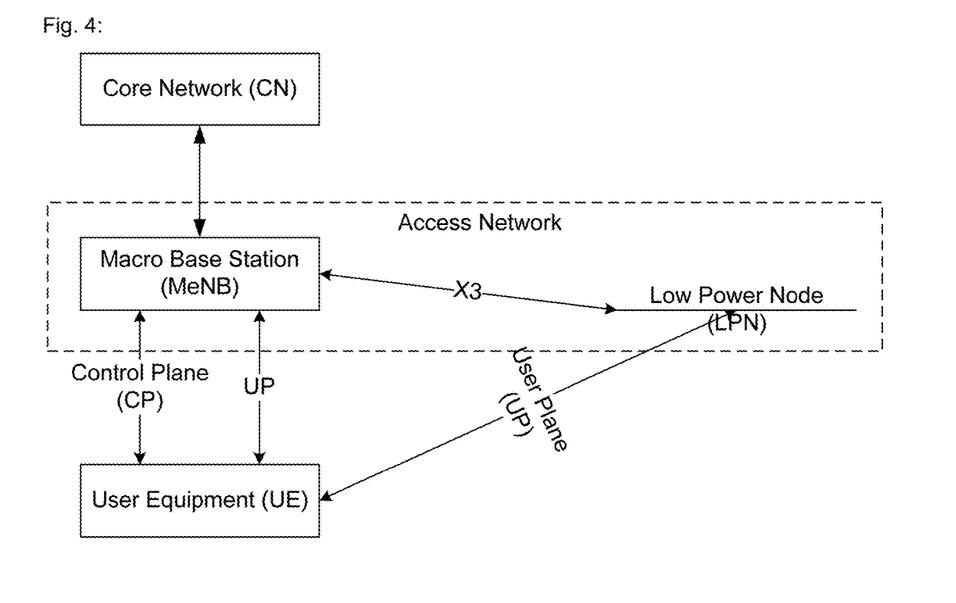
FIG. 4 is a schematic structure diagram of a system for transmitting data in accordance with an embodiment of the present disclosure, which connects with the CN and a UE.

FIG. 4 is a schematic structure diagram of a system for transmitting data in accordance with an embodiment of the present disclosure, which connects with the CN and a UE. The system may include an LTE Core Network (CN), an LTE access network consisting of a MeNB and an LPN, and an LTE UE that can support a mechanism for transmitting/receiving multiple data streams. The LTE CN may be the core network of the existing LTE network. The connection between the master node and CN, and connection between the master node and the UE may be an existing control plane connection and an existing user plane connection respectively, and the connection between the shunting node and the UE may be an existing UP connection.

In the control plane, the master node may be responsible for all control management with the UEs, and further be responsible for control plane information required by the shunting nodes such that the shunting nodes may hold necessary context information of the UEs, configure the protocol layers and schedule the UEs effectively.

In the user plane, the master node may be configured to transmit one part of downlink data, which is received from the CN and is intended to the UEs, to the UEs through the UP connections between the master node and the UEs, and transmit the other part of downlink data to the shunting nodes through an X3 interface. Accordingly, the shunting nodes may be configured to transmit the other part of downlink data to the UEs through an air interface based on an existing technology. As such, the master node that has a heavy load may shunt a part of user data to the shunting nodes for transmitting. When the shunting nodes are LPNs, the signalings in a handover procedure due to moving of UE between small cells may be reduced, thus reducing the message load in the network. For the UEs, the extended frequency band in multi-carrier transmission can better meet the requirements of services that involve a large amount of data, and the power for transmission with the shunting nodes nearby can be saved. Therefore, this system architecture can improve the user experience well.

The master node 31 may include a shunting management module that is configured to: when downlink data is transmitted, shunt the downlink data at an RLC sublayer to obtain shunted data packets, and send the shunted data packets to a corresponding shunting node; when uplink data is transmitted, converge data packets sent from shunting nodes and data packets sent from a UE, and send the converged data packets to the core network.

The shunting management module may be further configured to: shunt the downlink data at the RLC sublayer to obtain one or more groups of shunted data packets, send the shunted data packets to each shunting node, and send remaining downlink data except the shunt data packets to the UE.

The shunting management module may be further configured to: shunt an RLC PDU into one or more group of shunt data packets. For the size of each group of shunt data packets, the number of shunt data packets may be adjusted based on the current signal quality and/or load of each shunting node.

The shunting management module may be further configured to: select a shunting node for the UE according to quality of wireless signals transmitted between the UE and the shunting nodes, and send control plane information of the UE to the selected shunting node.

The shunting management module may be configured to: send the shunt data packets directly to the corresponding shunting nodes; or, pre-process the shunt data packets and then send the pre-processed shunt data packets to the corresponding shunting nodes. The pre-processing may be set based on the actual situation, which, for example, may be segmenting the RLC PDU.

The shunting management module may be further configured to: acquire quality of wireless signals transmitted between the UE and each of the shunting nodes in real-time; when the quality of wireless signals corresponding to a shunting node is lower than a preset threshold, notify the corresponding shunting node and the UE corresponding to the shunting node that shunting is suspended or a corresponding shunting link is removed.

The shunting management module may be further configured to: receive status report returned by the UE; and according to the status report, determine whether to retransmit the data packets and determine whether to delete the links between the shunting nodes and corresponding UE.

The shunting management module may be further configured to: receive status report returned by the UE and/or the shunting nodes, extract data packet reception success/failure message from the status report, count times of failures for the data packets that failed to be transmitted, and re-transmit the data packets, discard the data packets transmitted successfully; and if the times of failures for the data packets that failed to be transmitted are greater than a preset threshold, delete the links between the shunting nodes and corresponding UE.

The shunting management module may be further configured to: determine whether to perform shunting and formulate corresponding shunting strategies (e.g., shunting protocol layers of data) according to information acquired in real-time (e.g., measurement information reported by the UE) and pre-configured information (e.g., interfaces between nodes); regulate data traffic of the X3 interface, manage the shunting links between the shunting nodes and the UE, for example, indicating corresponding shunting node and the UE to delete shunting user/cell when signal quality of a link changes.

Figure 5:
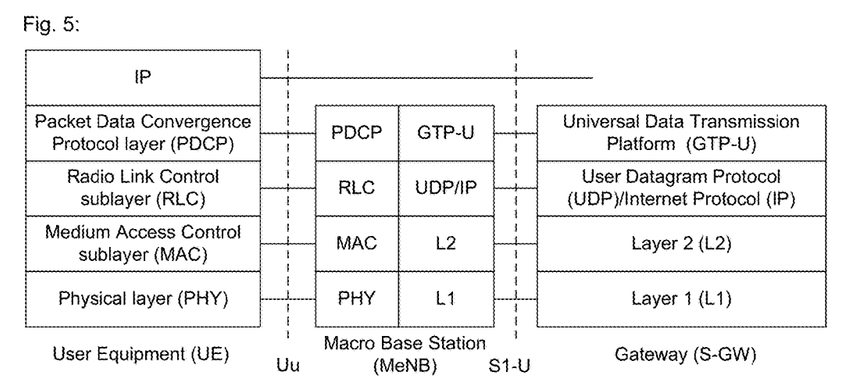
FIG. 5 is a schematic diagram of a protocol stack of existing user plane.

The step of formulating corresponding shunting strategies may include determining a protocol where data packets are shunted. In the existing protocol stack (as shown in FIG. 5), a data packet transmitted through an air interface is needed to be processed at Layer 2 (L2) protocol layer. L2 protocol layer may include a Packet Data Convergence Protocol (PDCP) sublayer, a Radio Link Control (RLC) sublayer and a Medium Access Control (MAC) layer. The L2 protocol layer processes the data packet and delivers the processed data packet to the Physical layer (PHY) for transmitting to a receiving end through a wireless link.

The lower the layer where the shunting is performed is, the faster the data transmission is scheduled, the fewer protocol layers that are needed to be reconstructed when a cell handover occurs, and the more simple the processing by the UE is; however, on the other hand, the processing in the network side would be more complex. Hence, a compromising and optimal solution is to perform shunting at the RLC sublayer. It is noted that, in the present disclosure, the shunting at the RLC layer is intended to mean that an RLC PDU is shunted into two or more group of data packets and sent to a receiving end; correspondingly, the receiving end concatenates the received data packets at the RLC sublayer.

Figure 6:
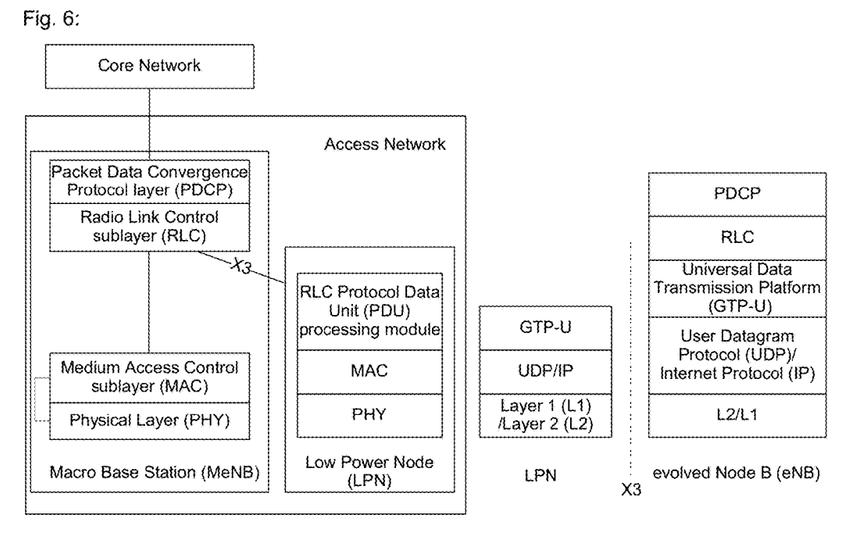
FIG. 6 is a schematic diagram of a protocol stack of X3 interface in the structure of an embodiment of the present disclosure.
Figure 7:
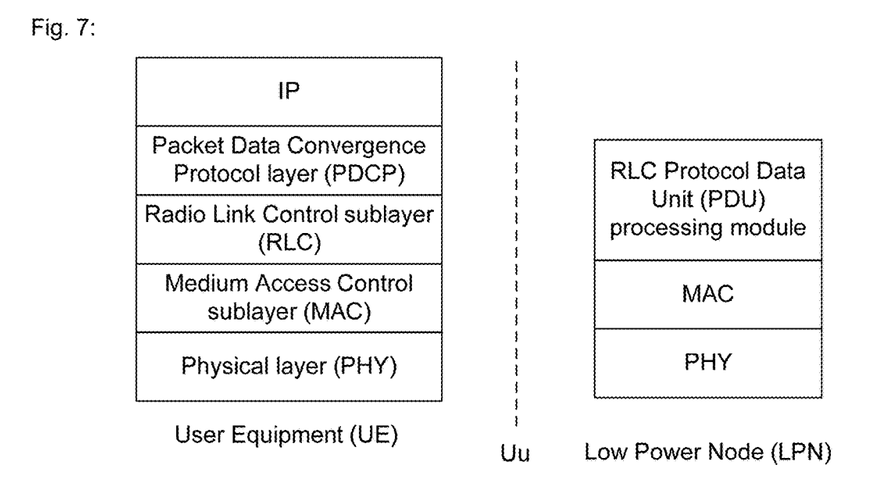
FIG. 7 is a schematic diagram of a protocol stack of wireless interface between a shunting node and a UE in accordance with an embodiment of the present disclosure.

Specifically, in a multi-stream user data transmission architecture in which a UE establishes UP connections with a master node and one or more shunting nodes in the access network, when the shunting is performed at the RLC sublayer, FIG. 4 shows protocol model for shunting node in the access network and available protocol stacks for the X3 interface. In FIG. 6, the figure on the right shows an example available protocol stack for the X3 interface, in which the master node transmits the RLC PDUs that are needed to be shunted to a shunting node through a GTP-U tunnel; based on the actual form of the X3 interface, the transmission tunnel may be in the form of other protocols.

The shunting management module may be configured to perform functions of an RLC entity. The functions of an RLC entity may include, but not limited to:

transmitting upper layer PDUs;

transmitting a part of RLC PDUs to shunting nodes according to shunting traffic controlled by the shunting management module;

RLC reconstruction;

for unacknowledged mode (UM) data and acknowledged mode (AM) data: concatenating, segmenting and recombining the RLC SDUs; the size of data packets transmitted to the shunting nodes may not be processed, or the data packets transmitted to the shunting nodes may only be segmented into data packets having small size;

re-ordering the RLC PDUs;

repeating detection;

discarding RLC data SDU;

for the AM data:

performing error correction by an ARQ program, including: counting the times of retransmission for downlink shunting data packets; when the times of retransmission reaches a maximum, indicating the shunting management module of the master node to notify the UE and the shunting nodes to delete the wireless links between them, and transmitting the shunting data packets and all subsequent data packets by the shunting management module (until another possible shunting occurs again);

re-segmenting the RLC data PDUs;

performing a protocol error detection.

Preferably, the above shunting management module may be implemented by a CPU in the master node.

The shunting node 32 may include an RLC PDU re-processing module configured to: determine that received data is uplink data or downlink shunted data packets; when downlink shunted data packets are received, process the shunted data packets and send the processed data packets to a corresponding UE; and when uplink data is received, send the uplink data to the master node.

The RLC PDU re-processing module may segment or concatenate the shunted data packets. For example, the RLC PDU re-processing module may re-segment/re-concatenate downlink data packets transmitted by the master node based on an indication from the MAC layer of the shunting nodes, include an indication, which may be an additional field, in the protocol header of the data packets, and deliver the packaged data packets to a lower layer.

The RLC PDU re-processing module may be configured to re-transmit the data packets that failed to be received by the receiving end, and delete the data packets that received successfully by the UE from the buffer.

The RLC PDU re-processing module may be configured to send a status report to the UE.

Figure 8:
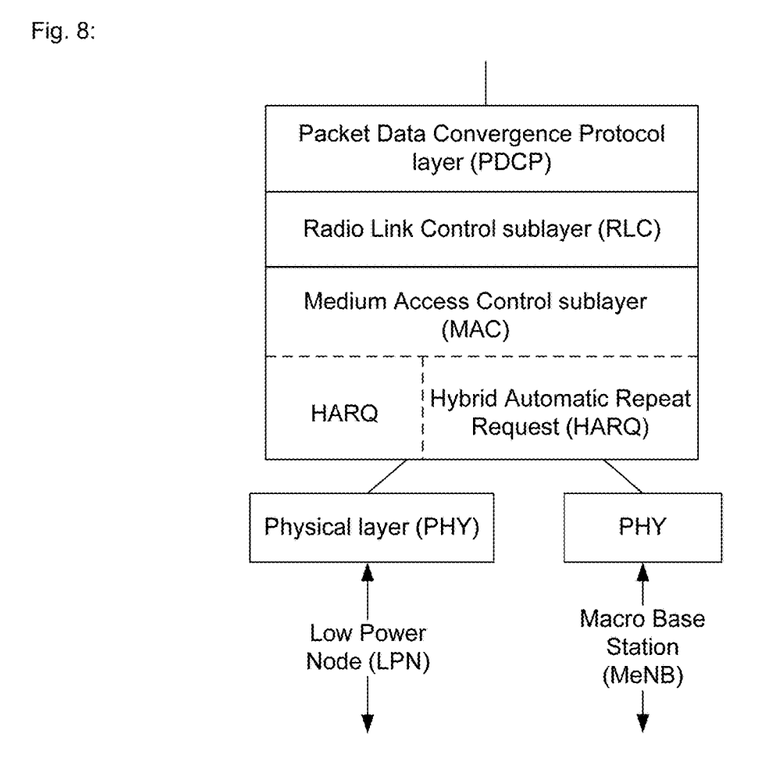
FIG. 8 is a schematic diagram of a protocol stack in a UE in accordance with an embodiment of the present disclosure.

The functions required for re-processing the RLC PDU in the RLC PDU re-processing module may be implemented by a CPU in the shunting node. FIG. 8 shows protocol stacks for the wireless interface between a shunting node and a UE.

The RLC PDU re-processing module may include (but not limited to) at least one of the following functions:

downlink data packets transmitted by the master node may be re-segmented/re-concatenated based on an indication from the MAC layer of the shunting nodes, an indication (e.g., an numbered additional field) may be included in the protocol header of the data packets, and the packaged data packets may be delivered to a lower layer;

according to the status report returned by the UE, the data packets that failed to be received by the receiving end may be re-transmitted (the re-segmentation may be performed again), and the data packets that received successfully by the UE may be deleted from the buffer;

as a receiving end for uplink data, a status report may be send to the UE.

In embodiments of the present disclosure, the protocol stacks for the UE may be in the form as shown in FIG. 8, i.e., at UE side, each data bearer corresponds to an RLC entity, and the transmissions corresponding to different wireless interfaces are separated in the HARQ entity of the MAC layer. Besides existing functions, the RLC entity of the UE is further needed to have the following functions: being able to identify the form by which the shunting node numbers the data packets and perform de-encapsulation correspondingly; ordering and recombining the downlink data received from nodes in the access network jointly; sending a status report about the reception of the data packets, to all nodes that have accessed or only to the master node; receiving status reports from a plurality of nodes, and re-transmit or delete the RLC SDUs based on the information included in the status reports.

With the system architecture and solution for shunting in the present disclosure, the network can provide fast and efficient multi-stream joint transmission services for user equipment to meet the needs of users.

Embodiment 1

A Macro eNB (MeNB) and a Low Power Node (LPN) may be deployed in a network, which form an access network of system architecture in accordance with embodiments of the present disclosure. In this embodiment, a MeNB is used as a master node, and an LPN is used as a shunting node.

Specifically, in the transmission of downlink data, a shunting management module in the MeNB may be configured to: formulate a strategy for shunting, control the shunted transmission traffic, shunt the downlink data transmitted from the core network, transmit the shunted data to the LPN, and transmit remaining data to the UE directly.

The LPN may re-process the received shunted data, and transmit the re-processed shunted data to the UE through a shunting link.

The UE may receive data packets through the wireless links with each access nodes, and perform joint processing on the data packets.

Figure 10:
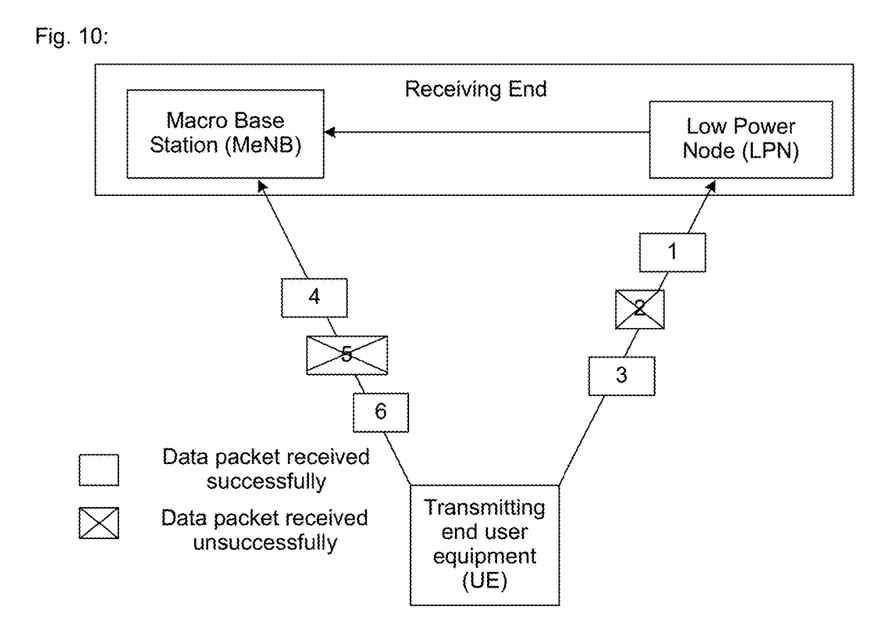
FIG. 10 is a schematic diagram of uplink data transmission.

The shunting management module may be configured to: select an LPN corresponding to a small cell as a shunting cell for the UE that accesses the macro cell based on information about processing capability of the UE, service requirements, measurement report about wireless environment, network load, etc.; use an RLC layer as a shunting protocol layer, encapsulate the shunting data to be transmitted into RLC PDUs, and perform reordering, recombination and duplicate detection on the received data; detect the quality of signals from the LPN and resource load of the LPN in real-time, control the traffic of the shunting data (i.e., control the amount of data packets to be shunted and transmitted to the LPN), and adjust the traffic of the shunting data with changes in circumstances dynamically/semi-statically. For example, as shown in FIG. 10, the MeNB shunts RLC PDUs in group of three. The PDUs with RLC SN=1, 2, 3 are transmitted to the LPN (the RLC PDUs with smaller numbers may be transmitted to the LPN firstly in order to mitigate the impact of the delay caused by the X3 interface), the PDUs with RLC SN=4, 5, 6 are transmitted to the UE, and so forth.

The shunting management module may be configured to notify the LPN and UE to suspend the shunting transmission or delete the shunting link when it detects that the quality of signals from the LPN is below a specified strength threshold or the success rate of transmission of data packets is below a specified success rate threshold. The strength threshold may be data preset according to the actual situation, and the success rate threshold may be a numerical value preset according to the actual situation.

The shunting management module may be configured to perform the functions of the RLC layer. On the basis of the prior art, functions of the RLC layer may further include that: in terms of downlink data, based on a shunting strategy, the RLC layer segments/recombines the RLC PDUs to be transmitted on a wireless link between the UE and the MeNB according to an indication from the MAC layer; the shunting data that is delivered to the LPN may be RLC PDUs that are encapsulated by the MeNB by merely adding an RLC header (with an RLC SN number) into PDCP PDUs (i.e., without segmentation/concatenation processing), or may be RLC PDUs that are obtained by pre-processing the PDCP PDUs roughly (for example, segmenting the PDCP PDUs into RLC PDUs having small size), which may reduce the processing operation of the RLC PDU module in the LPN. The functions of the RLC layer may further include that: in terms of uplink data, the RLC PDUs may be reordered jointly, detected repeatedly and discarded (if possible). The uplink data may include data packets received through wireless links and through X3 interface.

In terms of downlink data, the MAC layer indicates the size of data packets that can be sent currently based on the wireless channel condition and available resources for transmitting at the transmitting time. According to the indication from the MAC layer, the RLC PDU re-processing module in the LPN may re-process the packet size of RLC PDUs received on the X3 interface.

The re-processing the packet size may include but is not limited to the following situations:

No re-processing is needed: When a data packet with RLC SN=1 is received from the MeNB, the size of which conforms to the indication from the MAC layer about size of packets that can be transmitted at the present transmitting time, the data packet may be delivered to the MAC layer directly.

Re-segmenting: when the available transmission resources at a second transmitting time indicated by the MAC layer do not satisfy the size of a PDU with RLC SN=2, this RLC PDU may be re-segmented into data packets with size that conforms to the size indicated by the MAC layer by adding a segment number "a" in the protocol header (a serial number of 2a may be used to indicate the subsequent re-segmented data packets), and then the re-segmented data packets may be delivered to the MAC layer; remaining part of the PDU with RLC SN=2 is numbered by a serial number of 2b and is stored in a buffer for subsequent processing.

It should be noted that, the numbering form of 2a is only an example, and there are many methods for identifying the re-segmented data packets, which aim to identify data packets re-segmented by a shunting node acted as a transmitting end, such that a receiving end can obtain the SN of original RLC PDU that the re-segmented data packets belong to and identify which part of the original RLC PDU that the re-segmented data packets belong to.

Re-concatenating: When the available transmission resources at a third transmitting time indicated by the MAC layer are large, the RLC PDU re-processing module in the LPN may be allowed to re-concatenate the data packet with a serial number of 2b with a data packet with RLC SN=3, and then delivered the re-concatenated data packet to the MAC layer.

The RLC PDU re-processing module may include a buffer for storing the received data packets that have not been processed (UM PDU or AM PDU)/data packets that have not been acknowledged as being transmitted successfully (AM PDU).

The RLC PDU re-processing module may be transparent to the uplink data and be configured to transmit the received data packets that have been processed by the MAC layer to the MeNB through the X3 interface.

The UE may include an RLC entity that is configured to, in terms of downlink data, identify the serial numbers of received RLC PDUs for recombination. For example, two data packets with serial numbers of 2a and 2b+3 respectively may be recombined into two data packets with RLC SN of 2 and 3 respectively. The RLC entity is further configured to, in terms of uplink data, based on a shunting strategy (determining to shunt, performing shunting on an RLC PDU) configured by a MeNB or determined by a UE, and according to the current available transmission resources for uplink data on physical channel and an indication from the MAC layer, perform necessary RLC operations (such as segmenting/concatenating, etc.) on the basis of the prior art, and then delivered the processed RLC PDU to corresponding MAC layer for transmitting.

Embodiment 2

In this embodiment, the deployment scenarios and system architecture are the same as that of the first embodiment. During the transmission of AM data, a receiving end may report to the sending end the packet reception success/failure by a status report. In the system architecture of the present disclosure, in terms of downlink data, the UE may send status reports to all access nodes; in terms of uplink data, a status report sent by a base station to an accessed UE may involve all data packets with default consecutive numbers.

Specifically, in terms of downlink data, on the basis of the prior art, the status report is further needed to be processed as follows.

When a UE as a receiving end for AM data is needed to send a status report, an RLC entity in the UE may include information about the successful/failure reception of all data packets (no matter on which link) during a certain period of time in the status report and send the status report to all accessed nodes.

As shown in FIG. 10, the MeNB transmits RLC PDUs with serial numbers of 4, 5 and 6 respectively to the UE, but only the RLC PDUs with serial numbers of 5 and 6 are received by the UE.

The LPN transmits RLC data packets with serial numbers of 1, 2a and 2b+3 respectively to the UE, but only the data packets with serial numbers of 1 and 2b+3 are received by the UE; the information included in the status report should indicate the successful reception of the data packets with serial numbers of 1, 2b+3, 5 and 6 and loss of the data packets with serial numbers of 2a and 4. The status report may be sent to a MeNB and an LPN by the UE.

Figure 9:
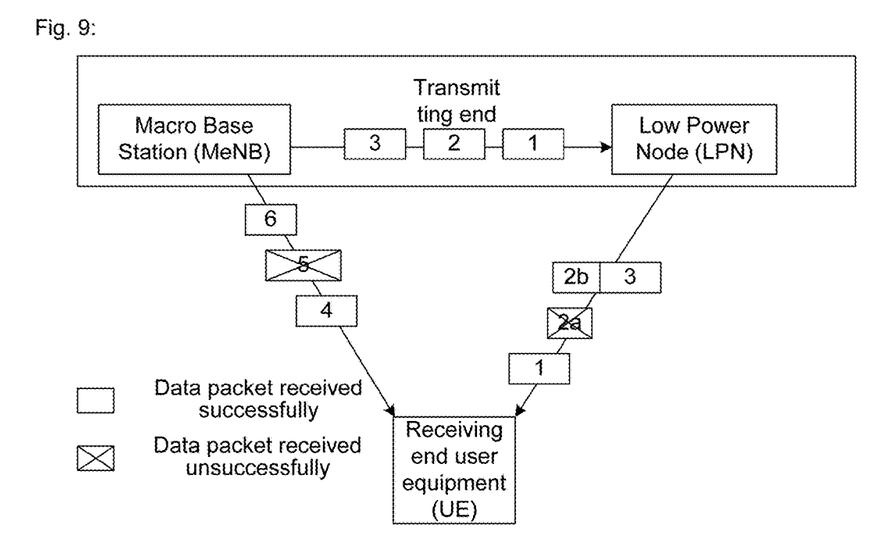
FIG. 9 is a schematic diagram of downlink data transmission.

The access network may receive the status report from the UE. The shunting node (i.e., the LPN) may retransmit the data packets that failed to be transmitted (as shown in FIG. 9, the LPN retransmits data packet 2a, and the data packet 2a may be re-segmented when it is retransmitted according to the indication from MAC layer about the current transmission resources if necessary), and the data packets that are successfully transmitted may be deleted from the buffer (such as data packets 1 and 2b+3).

On one hand, the master node (MeNB) retransmits the data packet with serial number of 4 and deletes the data packets with serial number of 5 and 6; on the other hand, the master node (MeNB) increases the retransmission parameter by 1 for the data packet with RLC SN=2.

It should be noted that, the control plane of the MeNB (Radio Resource Control) may be configured with maximum times of retransmission for a data packet. The MeNB may accumulate the times of retransmission for the same shunting data packet that fails to be transmitted whenever a status report is received from a UE (the accumulating is on the basis of RLC PDUs encapsulated by the MeNB at the RLC layer irrespective of re-segmenting by the shunting nodes, i.e., if the data packets with serial numbers of 2a and 2b+3 fail to be received, the MeNB just increases the times of retransmission by 1 for the data packet with serial number of 2).

When the times of retransmission for a data packet reach the maximum times, the MeNB may transmit the data packet by itself (for example, the MeNB transmits a data packet with RLC SN=2 to a UE, and when this data packet is received successfully by the UE, the UE may discard the data packet with serial number of 2a), and indicate the UE and the LPN to delete the shunting link.

In terms of uplink data, on the basis of the prior art, the status report is further needed to be processed as follows.

When the access network as a receiving end for AM data is needed to send a status report, the status reports sent by each base station may include reception of all data packets with consecutive numbers regardless of whether the transmitting end (UE) have transmitted the data packet to the base station actually.

For example, as shown in FIG. 10, the UE transmits the data packets with RLC SN=1, 2 and 3 to the LPN, and the data packets with RLC SN=1 and 3 are received successfully by the LPN; the UE transmits the data packets with RLC SN=4, 5 and 6 to the MeNB, and the data packets with RLC SN=4 and 6 are received successfully by the MeNB; so information included in a status report sent to the UE by the LPN may indicate that the data packets with RLC SN=1 and 3 are received successfully and the data packet with RLC SN=2 is lost (the LPN does not know the existence of subsequent data packets), and information included in a status report sent to the UE by the MeNB may indicate that the data packets with RLC SN=4 and 6 are received successfully and the data packets with RLC SN=1, 2, 3 and 5 are lost (it is assumed that the MeNB knows that the RLC SN is starting from 1).

If the UE receives a status report sent by the access network, an RLC entity in the UE may combine the information in all received status reports, and retransmit or delete the corresponding data packets in the buffer.

For example, as mentioned above, when the UE receives a status report from the LPN indicating that the data packets with RLC SN=1 and 3 are received successfully and receives a status report from the MeNB indicating that the data packets with RLC SN=4 and 6 are received successfully, the UE may determine that the data packets with RLC SN=1, 3, 4 and 6 are transmitted successfully and delete these data packets from the buffer, and retransmit the data packets with RLC SN=2 and 5 (based on the recourses indicated by the access network, the data packets may not necessarily be retransmitted through the original wireless link).

Embodiment 3

In this embodiment, the deployment scenarios and system architecture are the same as that of the first embodiment. During transmission of AM data, in terms of downlink data, the UE may integrate the information about successful/failure reception of data packets from each access base station, and only sends a status report to the master node (MeNB); in terms of uplink data, the MeNB may integrate the data packets received through wireless links and the data packets received from the shunting nodes (LPN) through the X3 interface, and include the consequence information in a status report to be sent to the UE.

Specifically, in terms of downlink data, on the basis of the prior art, the status report is further needed to be processed as follows.

When a UE as a receiving end for AM data is needed to send a status report, an RLC entity in the UE may include information about the successful/failure reception of all data packets (no matter on which link) during a certain period of time in the status report and send the status report to the master node (MeNB, a complete CP connection is established between the UE and the master node).

As shown in FIG. 10, the MeNB transmits the RLC PDUs with serial numbers of 4, 5 and 6 to the UE, but only the data packets with serial numbers of 4 and 6 are received by the UE; the LPN transmits RLC data packets with serial numbers of 1, 2a and 2b+3 to the UE, but only the data packets with serial numbers of 1 and 2b+3 are received by the UE; so the information included in the status report should indicate the successful reception of the data packets with serial numbers of 1, 2b+3, 4 and 6 and loss of the data packets with serial numbers of 2a and 5. The status report may be sent to the MeNB by the UE.

The master node (MeNB) in the access network receives a status report sent by a UE. Based on the information indicated in the status report, the data packets that have been received successfully may be deleted from the buffer (such as the data packets with serial numbers of 1, 3, 4 and 6), and the data packet with serial number of 5 that fails to be transmitted may be retransmitted. For the data packets with RLC SN=2 (a part of which are transmitted successfully), the MeNB may indicate the LPN to retransmit corresponding part, and increase the retransmission parameter by 1 for the data packets with RLC SN=2.

The indication from the MeNB for the LPN to retransmit data packets may involve the following situations.

When the RLC PDU re-processing module in the LPN caches the AM data packets that have not been acknowledged, the MeNB may send a status report related to transmission of data shunted by the LPN to the LPN, such as a status report indicating successful transmission of the data packets with serial number of 1 and 2b+3, and the LPN may retransmit the data packet with serial number of 2a after receiving the status report (also may perform re-segmenting on the data packet if necessary).

When the RLC PDU re-processing module in the LPN does not cache the AM data packets that have not been acknowledged, the MeNB may retransmit the data packet with RLC SN=2 to the LPN, the RLC PDU re-processing module in the LPN may re-segment the data packet according to indication by the MAC layer of the LPN and transmit the re-segmented data packets to the UE (and indicate that this data packet is the retransmission of the data packet with RLC SN=2); after receiving the complete the data packet with RLC SN=2, the UE may discard the data with serial number of 2b.

It should be noted that, for an RLC entity, the control plane of the MeNB may be configured with maximum times of retransmission. The MeNB may accumulate the times of retransmission for the same shunting data packet that failure to be transmitted whenever a status report is received from a UE. When the times of retransmission for a data packet reach the maximum times, the MeNB may transmit the data packet by itself (for example, the MeNB transmits a data packet with RLC SN=2 to a UE, and when this data packet is received successfully by the UE, the UE may discard the data packet with serial number of 2b), and indicate the UE and the LPN to delete the shunting link.

During the transmission of uplink data, the UE may transmit one part of RLC PDUs to the MeNB and transmit the other part of RLC PDUs to the LPN. The LPN may transmit the other part of RLC PDUs to the MeNB through the X3 interface. For this case, the status report is further needed to be processed as follows.

When the access network as a receiving end for AM data is needed to send a status report, the RLC entity in the MeNB may integrate the reception of the data packets received from the UE through wireless links and the data packets received from the shunting nodes (LPN) through the X3 interface, and send a status report to the UE.

For example, the UE transmits the data packets with RLC SN=1, 2 and 3 to the LPN, and the data packets with serial numbers of 1 and 3 are received by the LPN and are further transmitted to the MeNB through the X3 interface; the UE transmits the data packets with RLC SN=4, 5 and 6 to the MeNB, and the data packets with RLC SN=4 and 5 are received by the MeNB; then, the MeNB may integrate the reception of the data packets received through wireless links and the X3 interface (received/lost), and send a status report to the UE including information indicating that the data packets with serial numbers of 1, 3, 4 and 6 are received successfully and the data packets with serial numbers of 2 and 4 are lost.

When the UE receives a status report sent by a master node in the access network, the UE may delete or retransmit the data packets in the buffer correspondingly based on the information indicated in the status report.

For example, as mentioned above, when the UE receives a status report from the MeNB indicating that the data packets with serial numbers of 1, 3, 4 and 6 are received successfully, the UE may determine that the data packets with serial numbers of 1, 3, 4 and 6 are transmitted successfully and delete these data packets from the buffer, and retransmit the data packets with serial numbers of 2 and 5 (based on the recourses indicated by the access network, the data packets may not necessarily be retransmitted through the original wireless link).

The above are only the preferred embodiments of the present disclosure, and are not intended to limit the protection scope of the present disclosure.

The invention claimed is:

1. A method for transmitting data, comprising:
when transmitting downlink data, shunting, by a master node, the downlink data at a Radio Link Control (RLC) sublayer to obtain shunted data packets, and sending the shunted data packets to shunting nodes; processing, by the shunting nodes, the shunted data packets, and sending the processed data packets to a User Equipment (UE); and
when transmitting uplink data, converging, by the master node, data packets sent from a shunting node and data packets sent from a UE, and sending the converged data packets to a core network;
further comprising the step, preceding sending the shunted data packets to the shunting nodes, of: selecting, by the master node, a shunting node for the UE according to quality of wireless signals transmitted between the UE and the shunting nodes, and sending control plane information of the UE to the selected shunting node.

2. The method according to claim 1, wherein the shunting the downlink data at the RLC sublayer to obtain shunted data packets and sending the shunted data packets to shunting nodes comprises:
shunting, by the master node, the downlink data at the RLC sublayer to obtain one or more group of shunted data packets;
sending the shunted data packets to each of the shunting nodes; and
sending remaining downlink data except the shunted data packets to the UE.

3. The method according to claim 1, further comprising: acquiring, by the master node, quality of wireless signals transmitted between the UE and each of the shunting nodes in real-time; when quality of wireless signals corresponding to a shunting node is lower than a preset threshold, notifying the corresponding shunting node and the UE corresponding to the shunting node to suspend the shunting or remove a shunting link.

4. The method according to claim 1, wherein the processing, by the shunting nodes, the shunted data packets comprises: according to an indication from a Media Access Control (MAC) layer, sending, by the shunting nodes, the shunted data packets directly or sending the shunted data packets after performing segmenting and/or concatenating on the shunted data packets.

5. The method according to claim 4, further comprising a step, after the step of sending the processed data packets to the UE, of:
receiving, by the master node, a status report returned by the UE, and determining whether to retransmit or delete the processed data packets according to the status report; and/or
receiving, by the shunting nodes, a status report from the UE, and determining whether to retransmit or delete the processed data packets according to the status report.

6. The method according to claim 1, further comprising a step, after the step of sending the processed data packets to the UE, of:
receiving, by the master node, a status report returned by the UE, and determining whether to retransmit or delete the processed data packets according to the status report; and/or
receiving, by the shunting nodes, a status report from the UE, and determining whether to retransmit or delete the processed data packets according to the status report.

7. A system for transmitting data, comprising: a master node and a shunting node; wherein,
the master node is configured to: when downlink data is transmitted, shunt the downlink data at an Radio Link Control (RLC) sublayer to obtain shunted data packets, and send the shunted data packets to the shunting node; when uplink data is transmitted, converge data packets sent from the shunting node and data packets sent from a User Equipment (UE), and send the converged data packets to a core network; and
the shunting node is configured to: when downlink data is transmitted, process the shunted data packets sent from the master node, and send the processed data packets to a UE; and when uplink data is transmitted, send the uplink data sent from the UE to the master node;
wherein the master node comprises a shunting management module configured to: when downlink data is transmitted, shunt the downlink data at the RLC sublayer to obtain shunted data packets, and send the shunted data packets to the shunting node; when uplink data is transmitted, converge data packets sent from the shunting node and data packets sent from the UE, and send the converged data packets to the core network;
wherein the shunting management module is further configured to: select a shunting node for the UE according to quality of wireless signals transmitted between the UE and shunting nodes, and send control plane information of the UE to the selected shunting node.

8. The system according to claim 7, wherein the shunting management module is further configured to: shunt the downlink data at the RLC sublayer to obtain one or more group of shunted data packets, send the shunted data packets to each shunting node, and send remaining downlink data except the shunted data packets to the UE.

9. The system according to claim 8, wherein the shunting node comprises an RLC protocol data unit (PDU) re-processing module configured to: when downlink data is transmitted, process the shunted data packets sent from the master node, and send the processed data packets to a UE; and when uplink data is transmitted, send the uplink data sent from the UE to the master node.

10. The system according to claim 9, wherein the RLC PDU re-processing module is further configured to: according to an indication from a Media Access Control (MAC) layer of a same node, send the shunted data packets directly or send the shunted data packets after performing segmenting and/or concatenating on the shunted data packets.

11. The system according to claim 9, wherein the RLC PDU re-processing module is further configured to: receive a status report returned by the UE; and determine whether to retransmit or delete the processed data packets according to the status report.

12. The system according to claim 7, wherein the shunting management module is further configured to: acquire quality of wireless signals transmitted between the UE and each shunting node in real-time; when quality of wireless signals corresponding to a shunting node is lower than a preset threshold, notifying the corresponding shunting node and the UE corresponding to the shunting node to suspend the shunting or remove a shunting link.

* * * * *